Aug. 11, 1931.   J. N. CAROTHERS ET AL   1,818,114
METHOD FOR THE PRODUCTION OF DRIED ACID CALCIUM PHOSPHATE
Filed June 11, 1926
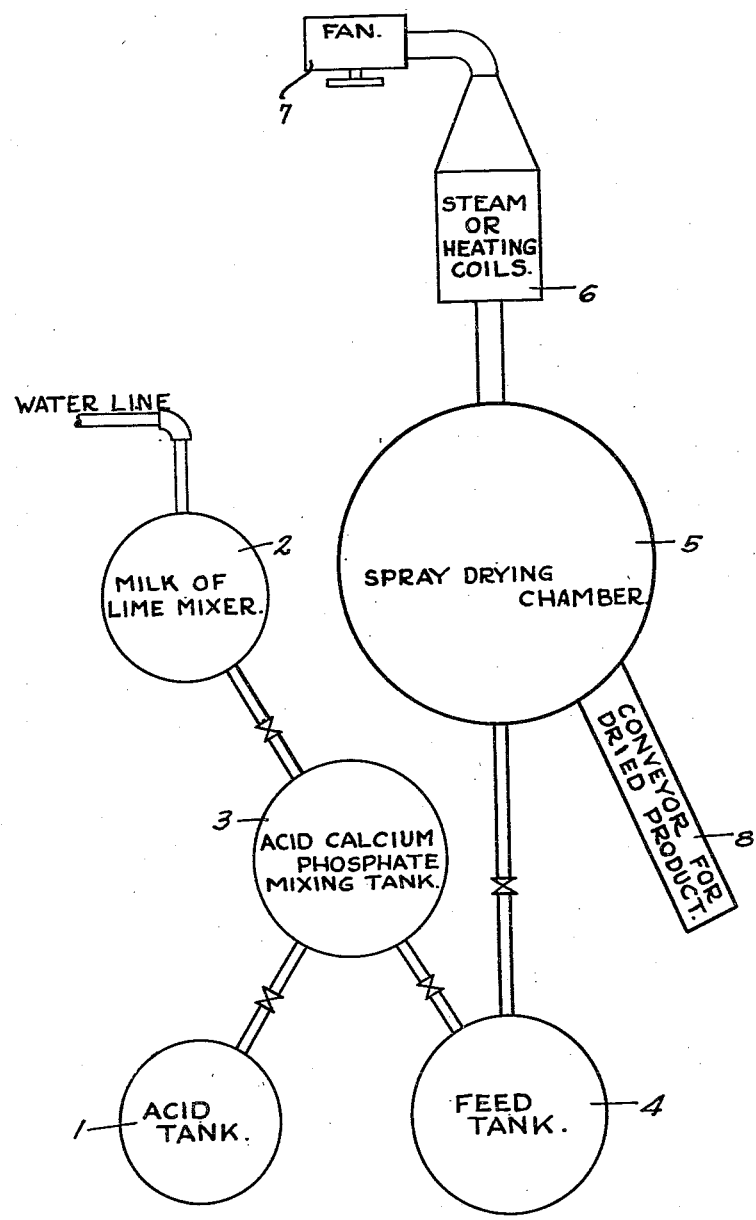
Inventors
J. N. CAROTHERS
& PAUL LOGUE.

Patented Aug. 11, 1931

1,818,114

UNITED STATES PATENT OFFICE

JOHN N. CAROTHERS, OF ANNISTON, ALABAMA, AND PAUL LOGUE, OF ST. LOUIS, MISSOURI, ASSIGNORS, BY MESNE ASSIGNMENTS, TO SWANN RESEARCH, INC., OF BIRMINGHAM, ALABAMA, A CORPORATION OF ALABAMA

METHOD FOR THE PRODUCTION OF DRIED ACID CALCIUM PHOSPHATE

Application filed June 11, 1926. Serial No. 115,191.

This invention relates to a method for the production of dried acid calcium phosphate from a slurry or suspension mixture of the same.

The object of this invention is to produce an improved product, and to reduce the cost of its manufacture.

Acid calcium phosphate is extensively used in baking powder preparations, which comprises starch, sodium bi-carbonate, and acid calcium phosphate; also in the preparation of "self-rising" flour which comprises the addition of salt, sodium bi-carbonate, and acid calcium phosphate to certain classes of flour. Also acid calcium phosphate is used as an "improver" in plain flour by the addition of small percentages of phosphate to the flour.

At present, acid calcium phosphate is produced with minor variations by the following methods:

Method #1. Phosphoric acid is added to lime in proportions sufficient to react and form essentially acid calcium phosphate.

Method #2. Lime is added to dilute phosphoric acid until the phosphoric acid is converted into di-calcium phosphate which precipitates and is filtered from the accompanying solution. The di-calcium phosphate is then treated with sufficiently concentrated phosphoric acid to form acid calcium phosphate.

In each of the above methods, the acid calcium phosphate is then allowed to stand for a certain period that the reaction may be completed between the phosphoric acid and the lime or di-calcium phosphate depending on the method used. After standing a sufficient period for such reaction to be completed, the moist acid calcium phosphate is dried, preferably in a vacuum dryer, after which it is ground to sufficient fineness for the desired purpose for which it is to be used.

These methods of manufacturing acid calcium phosphate have certain objections which complicate the process which results in forming products having undesirable characteristics, for instance, in the case of Method #1, there is always required an excess of lime to insure complete reaction in the formation of acid calcium phosphate and eliminations of appreciable quantities of free phosphoric acid. Part of this excess lime is lost as dust and part is combined with the phosphoric acid to form di-calcium phosphate. In ordinary practice there will be found approximately from 5% to 12% di-calcium phosphate in the commercial acid calcium phosphate produced by such method with free phosphoric acid averaging approximately 0.5% $H_3PO_4$. When the quantities of lime and acid are added in approximately theoretically correct proportions, there will be a low di-calcium phosphate content and in excess of 0.5% free $H_3PO_4$. The excess free acid is undesirable and objectionable in acid calcium phosphate because of the effect in the subsequent use of the acid calcium phosphate.

In the case of Method #2, it is possible to obtain a lower free acid in the acid calcium phosphate than in Method #1; however, the percentage of di-calcium phosphate will ordinarily be higher.

Inasmuch as there is difficulty in obtaining a product containing uniformly low free acid and also low di-calcium phosphate by either of the foregoing methods, it is obviously desirable to produce such an improved acid calcium phosphate by other means. Various methods have been proposed whereby this may be accomplished, for instance, that a solution of acid calcium phosphate may be spray dried and a suitable acid calcium phosphate produced. To dry a solution, as pointed out above, is unsatisfactory because of the low solubility of acid calcium phosphate and the corresponding increased quantity of water to be evaporated.

We propose obtaining a suitable dry acid calcium phosphate of high quality by spray drying a slurry or suspension of acid calcium phosphate, utilizing any type of spraying equipment, as a rotary disc for instance, which may be satisfactory. In carrying out our process a preferable procedure is as follows: Milk of lime having approximately 1.1 specific gravity, is run into a tank containing phosphoric acid of approximately 75% $H_3PO_4$. The addition is controlled by titration of the suspension formed and a satisfactory mixture should contain lime in approximately 5% excess of the theoretical quantity required. It is necessary to agitate the mixture vigorously during the addition of the milk of lime, and a mechanical agitator is suggested as a suitable type. The milk of lime may be cold or warm when added and no means are necessary to provide heating of the milk of lime. This milk of lime may preferably be made from slacked lime. The resultant suspension will have a specific gravity of approximately 1.38 at atmospheric temperature. The addition of milk of lime to the acid should be made at a slow rate to permit complete reaction between the milk of lime and the phosphoric acid. In case the addition is at too rapid a rate, there is a tendency to lump or agglomerate with unreacted lime in the center of the lumps. It is also undesirable to have the suspension heated prior to being sprayed.

The mixture must be constantly agitated to obtain a uniform composition flowing to the sprays. When gravity feed is used to the spray it is desirable to have a constant head tank overflowing to the supply tank that a constant pressure may be assured.

A comparison of the neutralizing value in units of sodium bi-carbonate of acid calcium phosphate produced by mixing phosphoric acid and lime as described in Method #1, and by spray drying a slurry or suspension will illustrate the improvement of the spray drying in obtaining a more thorough mixture, and higher quality product. Using the same method of testing, the neutralizing value of acid calcium phosphate obtained by Method #1 is 78 units of sodium bi-carbonate, while acid calcium phosphate obtained by spray drying a slurry or suspension gives a neutralizing value of 84 units sodium bi-carbonate.

Referring to the drawing which gives a diagrammatic outline illustrating suitable equipment to carry out our process, an acid storage tank 1 contains the proper concentration of phosphoric acid which is run into mixer 3, into which milk of lime is allowed to flow from tank 2. The completed suspension of acid calcium phosphate is run into feed tank 4 from which it flows by gravity to spray chamber 5, which is provided with means of obtaining heated air from fan 7, forcing air over heating coils 6. The dried acid calcium phosphate is removed from spray chamber 5, by suitable equipment, as conveyor 8.

Having thus described our invention, what we claim as new and desire to secure by Letters Patent, is:—

1. In the herein-described method of obtaining spray dried acid calcium phosphate, the step which consists in mixing phosphoric acid and lime to produce a suspension of acid calcium phosphate until said suspension contains approximately 5% excess lime over the theoretical requirement to produce mono calcium phosphate.

2. In the herein-described method of obtaining spray dried acid calcium phosphate, the step which consists in mixing concentrated phosphoric acid and milk of lime until said suspension contains approximately 5% excess lime over the theoretical requirement to produce mono calcium phosphate.

3. In the herein-described method of obtaining spray dried calcium phosphate, the step which consists in mixing strong phosphoric acid with milk of lime having approximately 1.1 specific gravity until the suspension thus formed contains approximately 5% excess of lime over the theoretical requirement to produce mono calcium phosphate.

4. In the herein-described method of obtaining spray dried acid calcium phosphate, the step which consists in mixing approximately 75% phosphoric acid with milk of lime having approximately 1.1 specific gravity until the suspension thus formed contains approximately 5% excess lime over the theoretical requirement to produce mono calcium phosphate.

5. In the herein-described method of obtaining spray dried acid calcium phosphate, the step which consists in producing a suspension of acid calcium phosphate having approximately 1.38 specific gravity, by adding milk of lime to 75% phosphoric acid until the said suspension contains approximately 5% excess lime over the theoretical requirement to produce mono calcium phosphate.

In testimony whereof we, affix our signatures.

JOHN N. CAROTHERS.
PAUL LOGUE.